(12) United States Patent
Lemaire

(10) Patent No.: US 8,486,358 B2
(45) Date of Patent: Jul. 16, 2013

(54) CARBON DIOXIDE CAPTURE METHOD, WITH OPTIMIZED ACID WASH SECTION

(75) Inventor: Eric Lemaire, Anse (FR)

(73) Assignee: IFP Energies Nouvelles, Rueil-Malmaison Cedex (FR)

( * ) Notice: Subject to any disclaimer, the term of this patent is extended or adjusted under 35 U.S.C. 154(b) by 0 days.

(21) Appl. No.: 13/615,818

(22) Filed: Sep. 14, 2012

(65) Prior Publication Data

US 2013/0078171 A1 Mar. 28, 2013

(30) Foreign Application Priority Data

Sep. 22, 2011 (FR) ...................... 11 02883

(51) Int. Cl.
*B01D 53/62* (2006.01)

(52) U.S. Cl.
USPC ........................................................ 423/228

(58) Field of Classification Search
USPC ........................................................ 423/228
See application file for complete search history.

(56) References Cited

U.S. PATENT DOCUMENTS

| | | | |
|---|---|---|---|
| 6,645,446 B1 * | 11/2003 | Won et al. | 423/210 |
| 7,938,889 B2 * | 5/2011 | Iijima | 95/183 |
| 8,007,570 B2 * | 8/2011 | Sonwane et al. | 95/183 |
| 8,262,787 B2 * | 9/2012 | Xu | 96/243 |
| 2003/0045756 A1 | 3/2003 | Mimura et al. | |
| 2010/0061904 A1 * | 3/2010 | Lund et al. | 423/229 |
| 2012/0282160 A1 * | 11/2012 | Just et al. | 423/228 |

FOREIGN PATENT DOCUMENTS

| | | |
|---|---|---|
| EP | 2 228 119 A1 | 9/2010 |
| WO | WO 2010/102877 A1 | 9/2010 |
| WO | WO 2011/087972 A1 | 7/2011 |

* cited by examiner

*Primary Examiner* — Timothy Vanoy
(74) *Attorney, Agent, or Firm* — Antonelli, Terry, Stout & Kraus, LLP.

(57) ABSTRACT

The carbon dioxide contained in combustion fumes is absorbed by an aqueous amine solution in section B1. The decarbonated fumes are then washed with water in wash section B3. In order to prevent the discharge of amine degradation products with the decarbonated fumes, operation of the method is monitored and a fumes acid wash section U is used when required by the operating conditions of the carbon dioxide capture method.

12 Claims, 2 Drawing Sheets

# CARBON DIOXIDE CAPTURE METHOD, WITH OPTIMIZED ACID WASH SECTION

FIELD OF THE INVENTION

The present invention relates to the sphere of combustion fumes decarbonation.

BACKGROUND OF THE INVENTION

In order to limit the global warming phenomenon, carbon dioxide ($CO_2$) is extracted from combustion fumes in order to be sequestered in an underground reservoir.

Absorption methods using an aqueous amine solution to remove $CO_2$ from a gas are commonly used. The gas is purified by contacting with the absorbent solution, then the absorbent solution is thermally regenerated.

One limitation of the absorption methods using an aqueous amine solution is the formation of degradation or side reaction products such as ammonia ($NH_3$), some alcohols, ketones, organic acids. Acid degradation products (formic acid, acetic acid, etc.) react irreversibly with the amine and form non-regeneratable salts (heat stable salts). These acid products are thus trapped in the liquid phase in form of salts and periodically eliminated via solvent purification operations (by distillation or reclaiming for example). On the other hand, basic or aprotic degradation products do not react with the amine. They are therefore distributed between the liquid phase and the gas phase. They are generally present in small amounts but they can have a high vapour pressure. Non-zero amounts of such degradation products therefore escape into the decarbonated fumes.

The problem of degradation products entrained by decarbonated fumes can be solved using a water wash section downstream from the $CO_2$ capture section. Document EP-502,596 can be mentioned by way of example, which provides a combustion fumes decarbonation method wherein the decarbonated fumes are washed with water to remove the reactive compounds from the absorbent solution, which were entrained by the fumes. However, water wash may be insufficient to reduce the proportion of degradation products to regulatory values.

As a supplement to water wash, document WO-2010/1,028,777 provides a second decarbonated fumes wash with an acid water so as to recover the degradation product traces that might not have been removed during the first water wash process.

The inventors have shown that the $CO_2$ capture method using a water wash section as described in document EP-502,596 under standard operating conditions allows the discharge of degradation products in the fumes to be kept at the desired regulatory level. However, upon changes in the operating conditions of the method, such as stops, starts, sudden variations in temperature or in the composition of the fumes, the water wash system may be insufficient to limit discharges to the regulatory proportion. Although these degradation product discharge peaks are temporary, it is unthinkable not to abide by the required regulatory values. Furthermore, it would be uneconomic to dimension the water wash section in order to control the discharge peaks during these transient phases.

The present invention aims to monitor operating parameters of the method so as to be able to anticipate degradation product discharge variations, notably as regards ammonia, and to use, during such variation phases, an acid wash section of the type described in document WO-2010/1,028,777 in order to prevent degradation product discharge peaks that would exceed the allowed regulatory values.

Besides, in a preferred embodiment, the present invention aims to use the acid wash section in order to reduce the proportion of volatile degradation products, notably ammonia, contained in the absorbent solution without discharging them to the atmosphere.

SUMMARY OF THE INVENTION

In general terms, the present invention relates to a method of capturing the $CO_2$ contained in the combustion fumes produced by a combustion unit, wherein the following stages are carried out:

a) contacting the combustion fumes with an absorbent solution comprising at least one amine in aqueous solution so as to obtain $CO_2$-depleted fumes comprising amine degradation products, and a $CO_2$-enriched absorbent solution, b) regenerating at least a fraction of the $CO_2$-enriched absorbent solution in a regeneration column provided with a reboiler so as to obtain a regenerated absorbent solution and a $CO_2$-rich gaseous effluent, the regenerated absorbent solution being recycled to stage a) as absorbent solution, c) washing in a first wash section the $CO_2$-depleted fumes obtained in stage a) by contacting with a first liquid water stream so as to obtain fumes depleted in amine degradation products and a water stream enriched in amine degradation products.

The method according to the invention is characterized in that at least the value of one of the operating parameters of said method is measured over time, in that the fumes depleted in amine degradation products obtained in stage c) are released to the atmosphere as long as said value is constant and in that, if a variation over time of said value is detected, stage d) hereafter is carried out:

d) washing in a second wash section at least part of the fumes depleted in amine degradation products obtained in stage c) by contacting with a second liquid water stream comprising at least one acid whose pKa value is below 6, so as to obtain a treated gas, and releasing said treated gas to the atmosphere.

According to the invention, said operating parameters can be selected from the list as follows: the $CO_2$ content of the combustion fumes prior to stage a), the temperature of the combustion fumes prior to stage a), the flow rate of the combustion fumes prior to stage a), the value of the reboiler power divided by the flow rate of the absorbent solution in stage a).

Stage d) can furthermore be carried out in case of change in the fuel supply to the combustion unit or in case of change in the $CO_2$ capture rate in stage a).

Stage d) can be carried out if a variation of at least 2% of said value in less than one hour is detected.

The ammonia content of the fumes depleted in amine degradation products, obtained in stage c), can be measured over time and stage d) can be stopped when said content falls below a predetermined threshold.

If a variation over time of said value is detected, stage d) can be carried out for at least a predetermined period of time.

The acid used in stage d) can be an inorganic acid selected from among $HNO_3$, $HNO_2$, $H_2SO_4$, $H_2PO_3$ and $H_3PO_4$. Alternatively, the acid used in stage d) can be an organic acid selected from among citric acid, oxalic acid, malonic acid, succinic acid, malic acid, tartric acid or orthophthalic acid.

It is possible to cool and to recycle part of the water stream enriched in amine and in amine degradation products obtained in the bottom of the first wash section so as to make up at least part of said first liquid water stream used in stage c).

It is possible to cool and to recycle part of the water stream obtained in the bottom of the second wash section so as to make up at least part of said liquid water stream used in stage d).

Furthermore, in the method according to the invention, the following stage can be carried out:

e) partly liquefying by cooling said gaseous effluent obtained in stage b) so as to obtain a $CO_2$ stream and a condensate, and contacting a portion of the condensate with the second water stream.

Stage e) can be carried out for a predetermined time when said value is constant.

BRIEF DESCRIPTION OF THE FIGURES

Other features and advantages of the invention will be clear from reading the description hereafter, with reference to the accompanying figures wherein.

DETAILED DESCRIPTION

Figure 1:
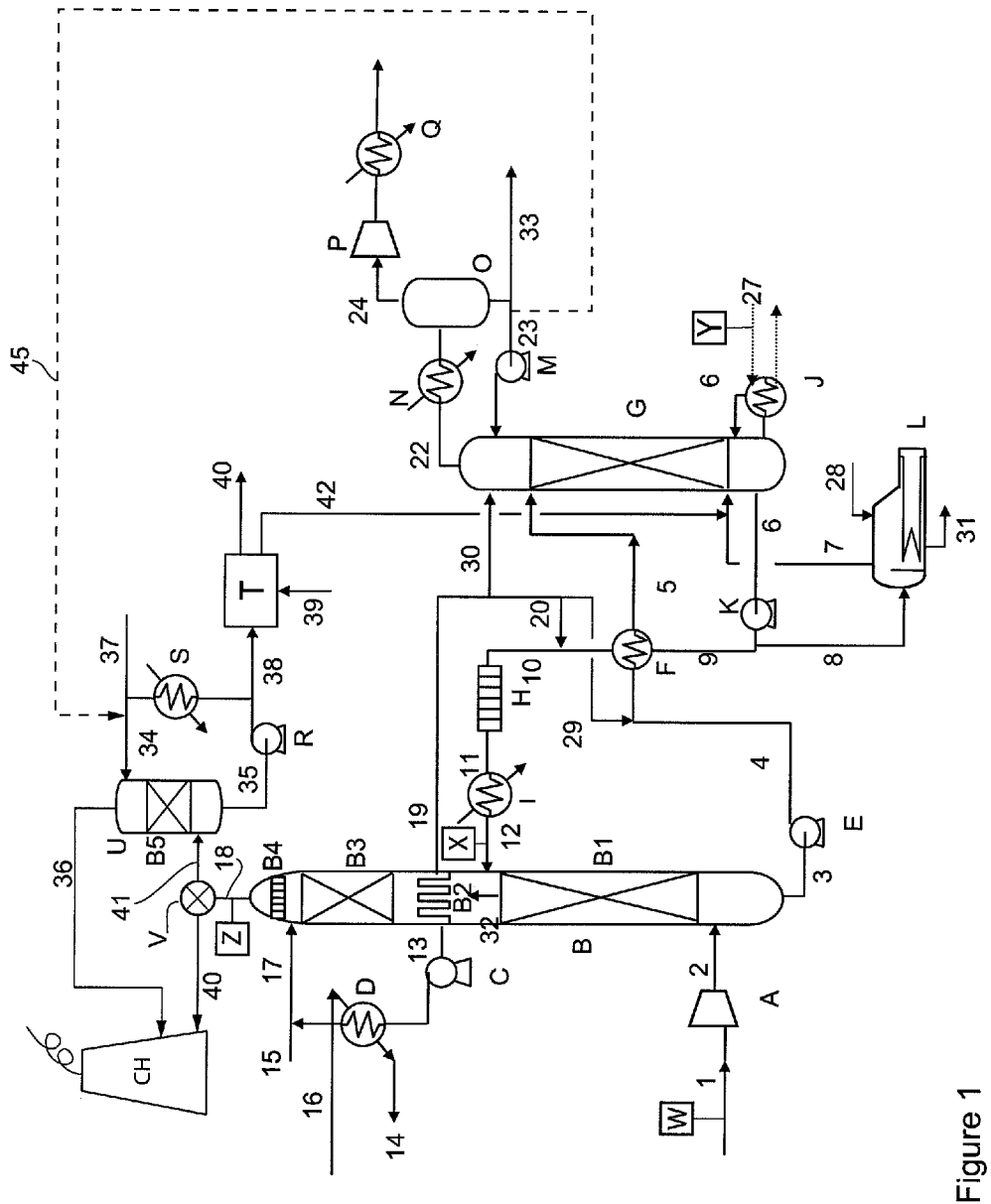
FIG. 1 diagrammatically shows a $CO_2$ capture method according to the invention, and FIG. 2 diagrammatically shows a variant of the method according to the invention.

In connection with FIG. 1, the combustion fumes to be treated flow in through line 1 at a pressure that can range between 1 and 40 bars abs, and at a temperature that can range between 10° C. and 100° C.

The combustion fumes can be produced by a thermal power plant for electricity generation. The capture method according to the invention can also be applied to any combustion fumes produced, for example, in a refinery, a cement plant, a steel plant, or a combustion fume produced in form of syngas through oxidation of a hydrocarbon-containing fuel.

The combustion fumes generally contain between 5 vol. % and 30 vol. % $CO_2$ and between 1 vol. % and 15 vol. % oxygen. In the case of combustion fumes, the proportion of SOx and NOx type compounds can reach a value of the order of 200 mg/Nm$^3$ by volume for each one of said compounds.

The combustion fumes flowing in through line 1 can be compressed by device A. For example, device A is a blower or a compressor providing a pressure increase of the order of 100 to 250 mbar.

The fumes are fed through line 2 into absorption section B1 provided with gas/liquid contacting elements, for example trays, a random packing or a stacked packing. In section B1, the fumes are contacted with the absorbent solution flowing in through line 12. The gas circulates countercurrent to the liquid solution. The absorbent solution captures the $CO_2$ contained in the fumes. A $CO_2$-laden absorbent solution is discharged through line 3 in the bottom of section B1. $CO_2$-depleted fumes are obtained at the top of section B1, this stream being represented by arrow 32.

The composition of the absorbent solution comprises amines in aqueous phase. The amines are selected for their capacity to absorb acid compounds. It is possible to use an aqueous solution generally comprising between 10 wt. % and 80 wt. %, preferably between 20 wt. % and 60 wt. %, amines. The aqueous solution can comprise between 20 wt. % and 90 wt. %, preferably between 40 wt. % and 80 wt. %, water. The absorbent solution can also contain an organic solvent, non reactive towards acid gases, but which allows the physical solubility of an impurity to be increased so as to improve its elimination (physical solvent).

The amines can be selected from among monoamines such as MEA (monoethanolamine), DEA (diethanolamine), MDEA (dimethylethanolamine), DIPA (diisopropylamine) or DGA (diglycolamine), and from among multiamines such as piperazine, N-(2-hydroxyethyl)piperazine, N,N,N',N'-Tetramethylhexane-1,6-diamine, N,N,N',N'-Tetraethyldiethylenetriamine, 1,2-bis(2-dimethylaminoethoxy)ethane, 1,2-bis (2-diethylaminoethoxy)ethane, 1,2-bis(2-pyrolidinoethoxy) ethane, 1,2,3,4-Tetrahydro-isoquinoline, 1-butylpiperazine and 2-methylpiperazine. These amines can be used alone or in admixture.

The amines can also be mixed with solvents of physical nature, for example methanol, sulfolane, the polyethyleneglycols that can be etherified, pyrrolydones or derivatives such as, for example, N-methylpyrrolidone, N-formyl morpholine, acetyl morpholine, propylene carbonate. For example, the absorbent solution comprises between 10 wt. % and 50 wt. % of a solvent of physical nature.

The absorbent solution discharged in the bottom of section B1 is pumped by pump E, fed into heat exchanger F through line 4 to be heated, then fed into regeneration column G through line 5.

All of the absorbent solution is generally sent to the regeneration column.

Alternatively, the absorbent solution obtained after passage through heat exchanger F can be divided into two fractions and only one fraction is then sent to regeneration column G. For example, the $CO_2$-laden absorbent solution can be separated into a $CO_2$-rich fraction and a $CO_2$-poor fraction. The $CO_2$-rich fraction is sent to column G, the $CO_2$-poor fraction is recycled and sent to the top of absorption section B1. This embodiment is described in detail in document FR-2,898,284.

Regeneration column G is equipped with gas/liquid separation internals, for example trays, random or stacked packings. The bottom of column G is equipped with a reboiler J that supplies the heat required for regeneration by vaporizing a fraction of the absorbent solution. Reboiler J is supplied with heat through line 27. In column G, under the effect of contacting the absorbent solution flowing in through line 5 with the vapour produced by J, the $CO_2$ is released in gaseous form and discharged at the top of G through line 22.

The regenerated absorbent solution, i.e. depleted in $CO_2$, is discharged in the bottom of column G through line 6, pumped by pump K and fed through line 9 into exchanger F to be cooled. The cooled absorbent solution is discharged through line 10 and fed into filter H in order to remove the solid compounds and particles. The absorbent solution discharged from H through line 11 is cooled in heat exchanger I and fed through line 12 into section B1.

The gas stream discharged at the top of G through line 22 is partly liquefied through cooling in exchanger N and fed into separator O. The condensates are entirely or partly recycled through line 23 and pump M to the top of column G as reflux. The possibly remaining condensates are discharged from the process by stream 33.

The $CO_2$-rich gas discharged at the top of drum O through line 24 is liquefied in order to be injected into an underground reservoir. The $CO_2$-rich stream can be compressed and dehydrated in devices P and Q so as to obtain a liquid $CO_2$ stream at approximately 110 bars, of very high purity, for example above 99 vol. % $CO_2$.

Part of the regenerated absorbent solution obtained in the bottom of G can be fed through line 8 into vaporization device L commonly referred to as a reclaimer. In device L, the absorbent solution is heated until it is vaporized. The vapours made up of water and amine are discharged from L through line 7 and fed into column G. The salts formed by the degradation of reactive compounds remain in the solid state in suspension in a liquid in the bottom of L, and they are cyclically extracted and discharged through line 31. The boiling-point temperature of the amine is generally higher than that of water. Vaporization of the amine at a pressure of the order of 1 to 2 bars requires high temperatures, which may cause new irreversible degradations to the amine. In order to overcome this problem, the distillation operation can be carried out under vacuum, but it is then necessary to recompress the vapours discharged from L through line 7 prior to feeding them into column G, which involves additional costs. Alternatively, water can be added through line 28 into reclaimer L to regulate the vaporization temperature. The less volatile the amine, the larger the amounts of water to be added to regulate the vaporization temperature. Furthermore, a strong base can optionally be added to the absorbent solution circulating in line 8, a sodium hydroxide solution for example, so as to free the amine trapped by reaction with string acids. The latter are collected in form of sodium salts and the amine in neutral form is vaporizable.

Purified gas 32 carries along a non-zero amount of organic compounds comprising notably amines and possible amine degradation products. In fact, at the top of zone B1, the liquid absorbent solution with a high amine concentration, for example 30 wt. % in the case of an aqueous MonoEthanolAmine solution, flows countercurrent to a gas circulating at a high rate. This contact results in a high amine and amine degradation product entrainment by the gas.

A specific wash section is used in order to avoid degradation product and amine discharges: the gas is subjected to water washing in order to recover the organic molecules present in the $CO_2$-depleted fumes. Gas 32 is fed into wash section B3 for countercurrent contacting with the water flowing in through line 17. Section B3 comprises gas/liquid contacting elements, for example trays, a random packing or a stacked packing. The purified fumes depleted in organic compounds are discharged from B3 through line 18. The water laden with organic compounds is collected in the bottom of wash section B3.

Part of the wash water recovered in the bottom of B3 is withdrawn through line 13, pumped by pump C, cooled by heat exchanger D and fed to the top of section B3 through line 17. In exchanger D, the wash water is cooled by a refrigerant flowing in through line 16 and discharged through line 14.

Optionally, fresh water can be supplied through line 15. Said water is mixed with the wash water circulating in the loop, then the water is fed through line 17 into wash section B3.

In connection with FIG. 1, a portion of the saturated wash water can be withdrawn through line 19 and fed to various points in the process.

The saturated wash water can be fed through line 20 into line 10 to be mixed with the regenerated absorbent solution obtained in the bottom of G. The water is preferably mixed with the regenerated absorbent solution that has been cooled after passage through exchanger F.

The saturated wash water can be fed through line 29 into line 4 to be mixed with the absorbent solution laden with acid compounds at the bottom of B1. The water is preferably mixed with the absorbent solution laden with acid compounds upstream from heat exchanger F.

The saturated wash water withdrawn through line 19 can also be fed into regeneration column G through line 30.

During standard operation of the method, water wash in section B3 allows to reduce the entrainment of amine degradation products, notably ammonia, below levels imposed by the regulations. In this case, purified fumes 18 are sent through valve V and line 40 to chimney CH so as to be released to the atmosphere.

On the other hand, in case of changes in the operating conditions of the method, such as stops, starts, sudden variations in temperature or in the composition of the fumes, a change in the capture rate set point, the entrainment of reaction by-products and of amine degradation products, notably ammonia, in purified fumes 18 obtained at the outlet of wash section B3 can rise above the levels imposed by the regulations. In this case, according to the invention, at least part of purified fumes 18 is sent through valve V and line 41 to additional wash unit U so as to capture the excess degradation products and to prevent possible discharge peaks for these products. The rest of purified fumes 18 is directly sent through line 40 to chimney CH. Three-way valve V allows stream 18 to be distributed among line 40 and line 41.

According to the invention, the increase in the proportion of amine degradation products in purified fumes 18 is anticipated by measuring at least one operating parameter of the $CO_2$ capture method. For example, at least one of the following parameters can be measured:
- the $CO_2$ content of the fumes to be treated 1
- the temperature of the fumes to be treated 1
- the flow rate of the fumes to be treated 1
- the flow rate of regenerated absorbent solution 12 fed into section B1
- the value of the power of reboiler J in relation to the flow rate of absorbent solution 12, i.e. the value of the power of reboiler J divided by the flow rate of absorbent solution 12. This parameter can be expressed in $J/m^3$.

The values of these parameters can be measured by detectors W arranged on line 1, detectors X arranged on line 12 and detectors Y arranged on line 27. Without departing from the scope of the present invention, other operating parameters of the method can be measured. When the value of at least one of these parameters undergoes a significant variation in a predetermined order (increasing or decreasing depending on the parameters) over time, decarbonated fume 18 is sent to additional wash unit U. For example, fumes 18 are sent to wash unit U when the value of the parameter varies by at least 2%, preferably by at least 4% or even at least 6%, in a time interval of less than 1 hour, preferably in a time interval of less than ½ hour and more preferably in a time interval of less than ¼ hour.

Prior to being fully operational, the method according to the invention can comprise a learning phase so as to best define the boundaries used for regulation. The order (increasing or decreasing), the variation thresholds (in percentage) and the time interval of the variation can be determined beforehand by carrying out tests or by observing the behaviour of the $CO_2$ capture process when the parameters evolve. For example, a test is conducted by increasing or by decreasing the value of one of the parameters in a given time interval. During the test, the ammonia content of fumes 18 is measured. The variation threshold is determined, i.e. the difference between the initial value and the value reached, associated with the time interval during which the variation occurs, which produces an increase in the ammonia content of the fumes above the regulatory value, for example above 10 vol. ppm ammonia. According to the invention, the variation thresholds associated with the time intervals thus determined are used to decide whether acid wash unit U should be activated or not.

Furthermore, according to the invention, at least part of decarbonated fume 18 can be sent to secondary wash unit U during transient phases of the capture process or of the combustion process producing the fume to be treated. For example, the transient phases can be:
- a combustion change in the combustion process. This is notably the case upon starting a coal-fired power plant with fuel
- a sudden variation in the combustion process meeting a variation in the electricity demand on the grid
- a change in the capture rate of the $CO_2$ capture method
- the need to decrease the ammonia content of the absorbent solution.

The present invention is not limited to the type of parameters or to the type of transient phases that may require using additional wash unit U so as to limit degradation product discharges.

According to the invention, a minimum operating time can be provided when wash unit U is started, for example at least ¼ hour, preferably at least ½ hour or even at least 1 hour. This time can be determined by users according to their process knowledge or by carrying out tests prior to implementing the method according to the invention.

When the capture process returns to stable operating conditions, additional wash unit U can be stopped and purified fumes 18 can be redirected directly to chimney CH through line 40.

Additional wash unit U can be stopped as soon as the measured proportion of degradation product, in particular ammonia, has dropped to a value below a threshold value in stream 18. The degradation product content can be measured using analytical online measurement devices Z arranged on line 18. Monitoring the ammonia content of decarbonated fumes 18 is appropriate because it is a simple and reliable measurement, it is one of the most discharged pollutants during such phases and having the highest specification. The threshold value can be the value allowed by law for decarbonated fumes discharged into the environment.

The additional wash unit comprises a secondary wash column provided with a gas/liquid contact section B5, for example trays, a random packing or a stacked packing. Section B5 allows to capture the amine degradation products, notably ammonia and mainly basic compounds. In section B5, the fumes are contacted with an acidified water flowing in through line 34. The fumes freed of the degradation products are discharged from B5 through line 36 and fed into chimney CH to be released to the atmosphere. The acid wash water laden with basic compounds is recovered in the bottom of wash section B5. The acid wash water recovered in the bottom of B5 is withdrawn through line 35, pumped by pump R and cooled by heat exchanger S prior to being fed to the top of section B5 through line 34. Optionally, acidified water can be supplied through line 37. Said acidified water is mixed with the acid wash water circulating in the loop, then the water is fed through line 34 into wash section B5.

The pH value of the acid aqueous solution used in said wash section U preferably ranges between 1 and 6, more preferably between 4 and 6. The acid used to decrease the pH value of the aqueous solution is selected so as to totally react with the basic compounds, thus guaranteeing total removal of the basic compounds, even as traces.

The capacity to totally eliminate the basic compounds in wash unit U can allow to send only part of gas 18 to unit U through line 41, the rest going directly to chimney CH through line 40. The distribution of stream 18 among line 40 and line 41 is achieved by valve V. Valve V allows to send 0 to 100% of stream 18 into line 40, the rest being sent to line 41. This distribution can be achieved in such a way that the mixture of streams 40 and 41 meets the standard relative to atmospheric discharges. Thus, it is possible to limit the size of drum U and to limit the acid consumption when using wash unit U.

Since the amines used for $CO_2$ capture generally have pKa values ranging between 8 and 10, the acid is so selected that its pKa value is below 6, preferably below 5 or even below 4, at 25° C. at infinite dilution in water. Thus, the reaction between the acid and the volatile basic compounds is total. By way of illustration, the carbonic acid $H_2CO_3$ obtained through $CO_2$ hydration does not meet the stated criterion because its pKa value is 6.3.

The acid used to decrease the pH value of the aqueous solution is preferably a strong inorganic acid. By way of illustration, it is possible to use $HNO_3$ (pKa=−1), $HNO_2$ (pKa=3.3), $H_2SO_4$ (pKa=−3 and 1.9), $H_2PO_3$ (pKa=2) or $H_3PO_4$ (pKa=2.1). $HNO_3$ is preferably used. Alternatively, one may consider lowering the pH value of the aqueous solution using non-volatile organic acids such as, for example, citric acid (pKa=3.13 and 4.76), oxalic acid (pKa=1.25 and 4.27), malonic acid (pKa=2.85 and 5.7), succinic acid (pKa=4.21 and 5.64), malic acid (pKa=3.46 and 5.10), tartric acid (pKa=3.04 and 4.37) or orthophthalic acid (pKa=2.95 and 5.41). The inorganic nature of the acid generally guarantees higher stability towards degradation reactions. The strong acid nature allows on the one hand to guarantee that the acid is totally dissociated in water, thus preventing the acid from being found in the treated gas, and on the other hand to guarantee better elimination of the basic organic compounds.

Indeed, the basic organic compounds (generically denoted by B) present in the vapour phase are absorbed by reaction with the acid $HNO_3$, for example, according to the reaction as follows:

$$B + HNO_3 \rightarrow BH^+ NO_3^-$$

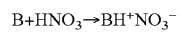

The basic organic compounds are then trapped in aqueous solution in form of salts, they are therefore no longer volatile and are thus not found in stream 36.

This reaction is all the more favourable since the organic compound is basic and the acid used is strong. This reaction occurs until total consumption of the acid. The acid aqueous solution is preferably regenerated, either sequentially, or continuously, by withdrawing part of the saturated acid aqueous solution and by introducing a non-saturated acid aqueous solution.

Periodically, a fraction of acid water laden with basic compounds is withdrawn from the loop through line 38 in order to guarantee the capacity of reaction of the acid water with the basic compound traces in section B5.

The acid wash water fraction laden with basic compounds is treated in equipment T that can carry out a thermal operation, an ion exchange operation, a dialysis operation, an electrolysis operation. Various instances can be encountered depending on the nature of the reactive compound, the nature of the acid gas to be treated, the unit operations available in the deacidizing unit.

In the case of volatile basic compounds, the saturated acid aqueous solution can be distilled. For example, a sequential operation of withdrawing a portion of the acid water from the acid wash section can be performed through line 38 and distillation of the portion withdrawn can be conducted in equipment T. In fact, through the agency of distillation, the water is evaporated and the salt concentration is thus increased up to the limit of precipitation. The suspended salt obtained in the bottom of the distillation drum can then be discharged through line 40 and sent to the water treatment unit, the purified water being reinjected through line 42 into column G, for example by mixing it with the stream circulating in line 7.

In the case of reinjection of the basic organic compounds (denoted by B) in the process, a strong base can first of all be added through stream 39, such as soda NaOH or potash KOH, until total neutralization of the acid (denoted by HX) according to the reaction as follows:

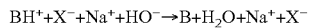
$$BH^++X^-+Na^++HO^-\rightarrow B+H_2O+Na^++X^-$$

This stage allows to release the basic organic compounds that are valorizable in neutral form, and therefore volatile.

In a second stage, purification can be carried out through distillation in equipment T. The valorizable basic organic compounds that are volatile in neutral form are vaporized and reinjected into the deacidizing unit via stream 42 while the heavy products are discharged through line 40.

Furthermore, according to the invention, the proportion of volatile degradation compounds, notably ammonia, in the absorbent solution can be decreased by withdrawing part of liquid 23 through line 45 in order to send and mix it with stream 34 prior to feeding it into equipment U. Preferably, this recycling operation is carried out temporarily, for a predetermined time, for example less than 2 hours, preferably less than 1 hour or even less than ½ hour. This time can be determined by the user for example depending on the amount of degradation compounds to be removed from the absorbent solution. Furthermore, recycling is preferably performed when section U receives no fume to be treated, i.e. when purified fumes 18 are entirely sent through line 40 to chimney CH. This allows to release the volatile degradation compounds, notably ammonia, in equipment U by reacting with the acid contained in stream 34. The excess stream added into unit U is sent after treatment to equipment T through line 42 in the absorbent solution circulation loop.

As shown in FIG. 1, absorption section B1 and wash section B3 can be arranged in the same column B. In this case, a liquid-tight tray B2 allowing passage of the gas from section B1 to section B3 can be used. Alternatively, absorption section B1 can be operated in a first column and wash section B3 can be operated in a second column distinct from the first one. The top of the first column is equipped with a line connected to the bottom of the second column for transferring the purified gas from the first column to the second column.

In order to minimize the diameter of equipment B, very high gas rates can be used, which does however not promote good separation between the liquid fed into B3 through line 17 and the gas discharged from B3 through line 18. According to the invention, in order to limit liquid losses in the stream discharged through line 18, a means B4 intended for gas/liquid mechanical separation can be arranged at the top of section B3. For example, means B4 can come in form of a dry tray or of a packing height that is not supplied with liquid, or of a drop eliminator pad. A means (not shown) intended for gas/liquid mechanical separation can also be arranged at the top of section B5.

Figure 2:
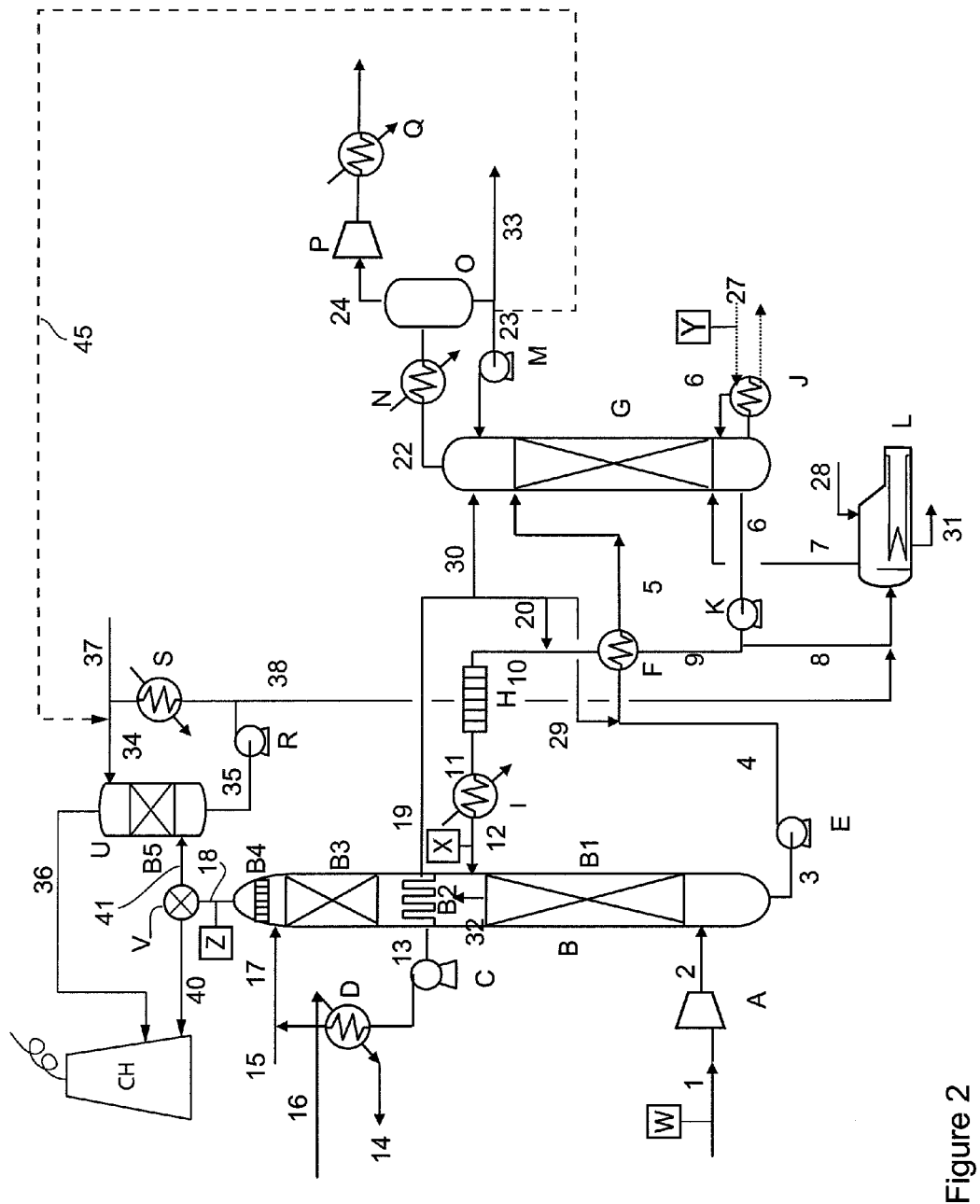

FIG. 2 diagrammatically shows a variant of the method wherein coupling of the treatment of the amine-saturated acid wash water and of the reclaiming operations is achieved. All the equipment and stream references identical to those of FIG. 1 designate the same equipments. In the case of reinjection of the basic organic compounds into the process, the acid wash water purification stage can be carried out in the same equipment L as the absorbent solution purification stage. In this configuration, a portion of the acid wash water is periodically withdrawn through line 38 and directly mixed with the absorbent solution periodically withdrawn in the bottom of column G via stream 8. The mixture of these two streams is sent to purification stage L. In device L, the absorbent solution is heated until it is vaporized. The vapours made up of water and amine are discharged from L through line 7 and fed into column G. The salts formed by the degradation of reactive compounds and the acid used for acid wash remain in the solid state in suspension in a liquid in the bottom of L and they are extracted cyclically prior to being discharged through line 31. Furthermore, a strong base can optionally be added to the absorbent solution circulating in line 8, for example a sodium or potassium hydroxide solution, so as to release the amine trapped by reaction with strong acids. The latter are recovered in form of sodium or potassium salts, and the amine in neutral form is vaporizable.

The operation example presented hereafter allows to illustrate the operation of the method according to the invention.

We consider the capture of $CO_2$ contained in fumes produced by a coal-fired power plant. The method uses an absorbent solution with 30 wt. % MEA in water for capturing the $CO_2$. When the power plant produces under steady state conditions, the proportion of $CO_2$ in the fumes to be treated is of the order of 14.5 vol. %, the capture rate is 90% of the $CO_2$ contained in the fumes to be treated and the proportion of ammonia in stream 18 is less than 10 vol. ppm, which meets the standard. However, during operation, a drop in demand on the power grid requires lowering the electricity production of the plant, which generates a drop in the $CO_2$ content of the fumes to be treated down to a value of 10 to 11%. This drop causes a decrease in the $CO_2$ partial pressure in wash section B3 and thus degassing of ammonia contained in wash water 17. The ammonia thus released is discharged in fumes 18 before a new equilibrium is established and allows again this wash section B3 to reduce the ammonia content of fumes 18 to a value below standard.

Typically, the $CO_2$ decrease can occur within 2 hours, ammonia degassing can produce an $NH_3$ peak up to 30 or 40 vol. ppm in stream 18 for 2 to 4 hours, then after 5 to 6 hours the value falls again below the 10 vol. ppm threshold imposed by the regulations.

According to the invention, detector W detects the decrease in the $CO_2$ content of the combustion fumes. Acid wash section U is therefore activated and part of stream 18 is sent to acid wash section U. For example, the distribution can be ¼ of stream 18 to 40 and ¾ to 41 so that the mixture of streams 40 and 41 released by chimney CH has an $NH_3$ content below the regulatory threshold.

Unit U is kept operating as long as detector Z measures an ammonia content in stream 18 that is above the 10 ppm threshold. Unit U operates for about 4 to 5 hours. As soon as detector Z measures an ammonia content in stream 18 that is below the 10 ppm threshold, operation of unit U is stopped and all of stream 18 is directly sent to chimney CH via valve V and line 40.

The invention claimed is:

1. A method of capturing the $CO_2$ contained in the combustion fumes produced by a combustion unit, wherein the following stages are carried out:
    a) contacting combustion fumes with an absorbent solution comprising at least one amine in aqueous solution so as to obtain $CO_2$-depleted fumes comprising amine degradation products, and a $CO_2$-enriched absorbent solution,
    b) regenerating at least a fraction of $CO_2$-enriched absorbent solution in a regeneration column provided with a reboiler so as to obtain a regenerated absorbent solution and a $CO_2$-rich gaseous effluent, regenerated absorbent solution being recycled to stage a) as absorbent solution, c) washing in a first wash section the $CO_2$-depleted fumes obtained in stage a) by contacting with a first liquid water stream so as to obtain fumes depleted in amine degradation products and a water stream enriched in amine degradation products, the method being characterized in that at least the value of one of the operating parameters of said method is measured over time, in that the fumes depleted in amine degradation products obtained in stage c) are released to the atmosphere as long as said value is constant and in that, if a variation over time of said value is detected, stage d) hereafter is carried out:

d) washing in a second wash section at least part of the fumes depleted in amine degradation products obtained in stage c) by contacting with a second liquid water stream comprising at least one acid whose pKa value is below 6, so as to obtain a treated gas, and releasing said treated gas to the atmosphere.

2. A method as claimed in claim 1, characterized in that said operating parameters are selected from the list as follows: the $CO_2$ content of the combustion fumes prior to stage a), the temperature of the combustion fumes prior to stage a), the flow rate of the combustion fumes prior to stage a), the value of the reboiler power divided by the flow rate of the absorbent solution in stage a).

3. A method as claimed in claim 1, characterized in that stage d) is furthermore carried out in case of change in the fuel supply to the combustion unit or in case of change in the $CO_2$ capture rate in stage a).

4. A method as claimed in claim 1, characterized in that stage d) is carried out if a variation of at least 2% of said value in less than one hour is detected.

5. A method as claimed in claim 1, characterized in that the ammonia content of the fumes depleted in amine degradation products obtained in stage c) is measured over time and stage d) is stopped when said content falls below a predetermined threshold.

6. A method as claimed in claim 1, characterized in that, if a variation over time of said value is detected, stage d) is carried out for at least a predetermined period of time.

7. A method as claimed in claim 1, wherein the acid used in stage d) is an inorganic acid selected from among $HNO_3$, $HNO_2$, $H_2SO_4$, $H_2PO_3$ and $H_3PO_4$.

8. A method as claimed in claim 1, wherein the acid used in stage d) is an organic acid selected from among citric acid, oxalic acid, malonic acid, succinic acid, malic acid, tartric acid or orthophthalic acid.

9. A method as claimed in claim 1, wherein part of the water stream enriched in amine and in amine degradation products obtained in the bottom of the first wash section is cooled and recycled so as to make up at least part of said first liquid water stream used in stage c).

10. A method as claimed in claim 1, wherein part of the water stream obtained in the bottom of the second wash section is cooled and recycled so as to make up at least part of said liquid water stream used in stage d).

11. A method as claimed in claim 1, characterized in that the following stage is carried out:

e) partly liquefying by cooling said gaseous effluent obtained in stage b) so as to obtain a $CO_2$ stream and a condensate, and contacting a portion (45) of the condensate with second water stream.

12. A method as claimed in claim 11, characterized in that stage e) is carried out for a predetermined time when said value is constant.

* * * * *